(12) United States Patent
Chatow et al.

(10) Patent No.: US 8,593,689 B2
(45) Date of Patent: Nov. 26, 2013

(54) SYSTEMS AND METHODS FOR SPECIFYING COLOR TOLERANCE INTENT AND IMPLEMENTATION AS PART OF A DIGITAL PRINT WORKFLOW

(75) Inventors: Ehud Chatow, Palo Alto, CA (US); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 288 days.

(21) Appl. No.: 13/052,942

(22) Filed: Mar. 21, 2011

(65) Prior Publication Data

US 2012/0243008 A1 Sep. 27, 2012

(51) Int. Cl.
*H04N 1/40* (2006.01)
(52) U.S. Cl.
USPC ............................ 358/2.1; 358/504; 358/468
(58) Field of Classification Search
USPC ........... 358/1.9, 2.1, 468, 500, 504, 400, 406, 358/518, 527
See application file for complete search history.

(56) References Cited

U.S. PATENT DOCUMENTS

| | | | |
|---|---|---|---|
| 7,538,917 B2 | 5/2009 | Rich et al. | |
| 2007/0165258 A1 | 7/2007 | Farrell et al. | |
| 2008/0180727 A1 | 7/2008 | Chatow et al. | |
| 2009/0201531 A1 | 8/2009 | Pandit et al. | |
| 2010/0073706 A1 | 3/2010 | Chan | |
| 2010/0123917 A1 | 5/2010 | Minagawa | |
| 2010/0290065 A1 | 11/2010 | Shestak | |

*Primary Examiner* — Thomas D Lee
*Assistant Examiner* — Stephen M Brinich

(57) ABSTRACT

Systems and methods are provided for enabling submission of color accuracy requirements with the submission of a print job. More specifically, a print job analysis system may be configured to receive a print job request having a color accuracy requirement level directly from a customer (or from an operator on behalf of the customer). In addition, the print job analysis system may also be configured to determine an appropriate color accuracy requirement level for the print job request if no color accuracy requirement level is directly provided with the print job request. Furthermore, the print job analysis system may also be configured to provide an analysis of recommended color accuracy requirement levels to the customer and/or the operator if they are unsure of an appropriate color accuracy requirement level to be used for the particular print job.

18 Claims, 3 Drawing Sheets

US 8,593,689 B2

SYSTEMS AND METHODS FOR SPECIFYING COLOR TOLERANCE INTENT AND IMPLEMENTATION AS PART OF A DIGITAL PRINT WORKFLOW

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Despite the emergence of the "electronic age," there is still great demand for printed products. For example, commercial printing has annual retail sales over $700 billion. Print service providers (PSPs) fulfill the demand for printed products by printing everything from photographs and brochures, course materials, periodicals and books, to advertisements and product packaging. The customers may be individuals, groups of individuals, or organizations (non-profit, small business, corporation, and the like). The PSPs may function to process print jobs for multiple individuals, such as the customers of a large retailer, wherein the large retailer takes orders from the individuals (e.g., for photo calendars), and submits the order as a batch of individual customer orders to the PSP.

In general, the customer creates the material to be printed, or works with a third-party provider to generate the material to be printed. The customer then submits an order including one or more materials for the PSP to print, along with one or more additional print parameters (e.g., paper type, layout, number of copies, due date, any special instructions such as laminating, and shipping information).

DETAILED DESCRIPTION OF SPECIFIC EMBODIMENTS

Figure 1:
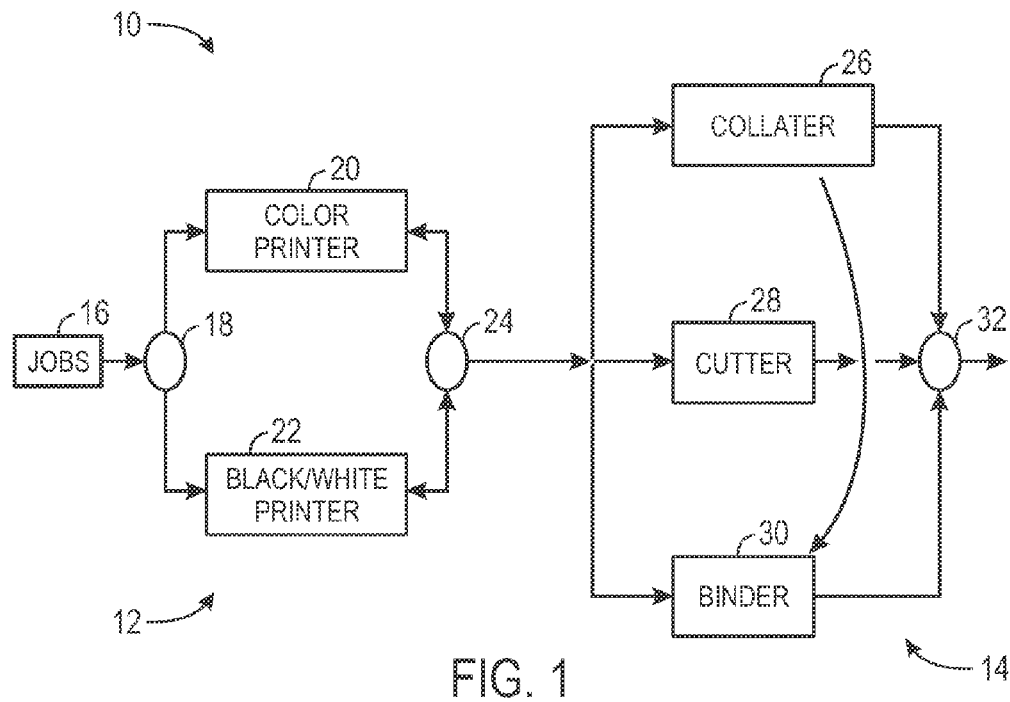
FIG. 1 is an example of a workflow of a typical PSP that may utilize color accuracy requirement levels in accordance with present embodiments.

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments presented herein are directed toward systems and methods for specifying color tolerance intent and implementation as part of a digital print workflow. Digital print workflows typically start with the creation of digital documents (e.g., PDF files) and end with physical documents generated through print jobs. Generally, before the actual execution of a print job, a digital workflow is created for predominantly automated execution within a print service provider (PSP). As described above, the PSP does not typically receive information relating to color tolerance as part of a specific print job definition. Rather, color accuracy requirements are usually either unspecified, uniformly applied, or included in the salesperson's notes. As such, they are not available to the automated workflow software for the optimization and sorting of the print jobs.

The embodiments presented herein address this shortcoming by adding a defined color tolerance parameter to the print job intent, which is attached to the print job from submission to the PSP and flows along with the print job through sorting, printing, and quality control (QC). This enables a more efficient process for sorting, scheduling, printing and QC, along with facilitating appropriate pricing schemes. The disclosed embodiments include changes in existing workflow steps and algorithms, such that higher value print jobs with tighter color tolerances may receive more attention and/or be printed after a specific color calibration process. Conversely, print jobs with looser color tolerances might be printed when the printing press has less accuracy, for example, when consumables (e.g., blankets, photoconductor drums, and so forth) are nearing the end of their lifetime, or with a lower frequency color calibration process of the printing presses. As such, not all print jobs are treated the same, but rather the order of processing of the print jobs may be adjusted to more properly match the color accuracy requirements of the print jobs with the color accuracy status of the printing presses. In addition, it should be noted that the actual content of the print job generally impacts the ability of the printing press to accurately print the print job. For example, it may be easier to print a black and white print job with tight tolerances than a full-color print job with tight tolerances. As such, the expected ability of a printing press to print a certain print job within desired tolerances may be taken into account when scheduling the print jobs. In addition, the printing presses may include automatic quality control checks, which may include color quality checks, among other things. As such, the printing presses may automatically set the sensitivity of the color quality checks based on the color accuracy requirements.

Turning now to the figures, FIG. 1 is an example of a workflow 10 of a typical PSP that may utilize color accuracy requirement levels in accordance with present embodiments. The workflow 10 consists of two main groups of machines: printing presses 12 and finishing machines 14. In particular, as illustrated in FIG. 1, print jobs 16 enter the workflow 10 at a pre-printing node 18, at which point any given print job 16 may be directed to either a color printer 20 or a black/white printer 22 (i.e., the printing machines 12) for color printing or black/white printing of the print job 16, respectively. Once the print job 16 has been printed, the print job 16 enters a post-printing/pre-finishing node 24, at which point the print job 16 may be directed to one or more of the finishing machines 14, which as illustrated may include a collator 26 for collating the print job 16, a cutter 28 for cutting the print job 16 into particular page dimensions, and a binder 30 for binding the print job 16. None, one, two, or all of the finishing machines 14 may be utilized for any particular print job 16. In addition, the finishing machines 14 for a particular print job 16 may be utilized in various orders. For example, as illustrated in FIG. 1, in certain embodiments, the print job 16 may be sent to a collator 26, a cutter 28, and a binder 30 in that particular order. In addition, as also illustrated in FIG. 1, in other embodiments, the print job 16 may be sent to a collator 26 and a binder 30 in that particular order. Once the print job 16 has completed processing through the finishing machines 14, it may exit the workflow 10 at a post-finishing node 32 where, for example, quality assurance (QA) of the print job 16 may be ascertained. It should be understood that a given PSP may include any number of color printers 20, black/white printers 22, collators 26, cutters 28, and binders 30. In addition, a given PSP may have a vast array of possible finishing machines 14, in addition to the collators 26, cutters 28, and binders 30 illustrated in FIG. 1.

The embodiments presented herein are directed toward the execution of the print jobs 16 through the color printers 20 of FIG. 1. More specifically, as presented herein, a definition relating to color accuracy for each print job 16 may be identified by customers and/or recommended by operators for each print job 16 before execution by the printing presses 12. Achieving a color accuracy of $\Delta E$ of 1 for many print job types (e.g., print jobs 16 having many image rich pages, print jobs 16 having different substrates, and print jobs 16 that may be executed over time and over multiple printing presses 12) can become costly, time consuming, and lead to a lower yield. Conversely, achieving a color accuracy of, for example, $\Delta E$ of 8 could be beyond the color tolerance that a particular customer or designer expects from the PSP. In conventional techniques, when the customer does not explicitly define the color tolerance for a print job 16, the acceptance of the color quality of the print job 16 is subjective, and can be dealt with differently by different PSPs.

Figure 2:
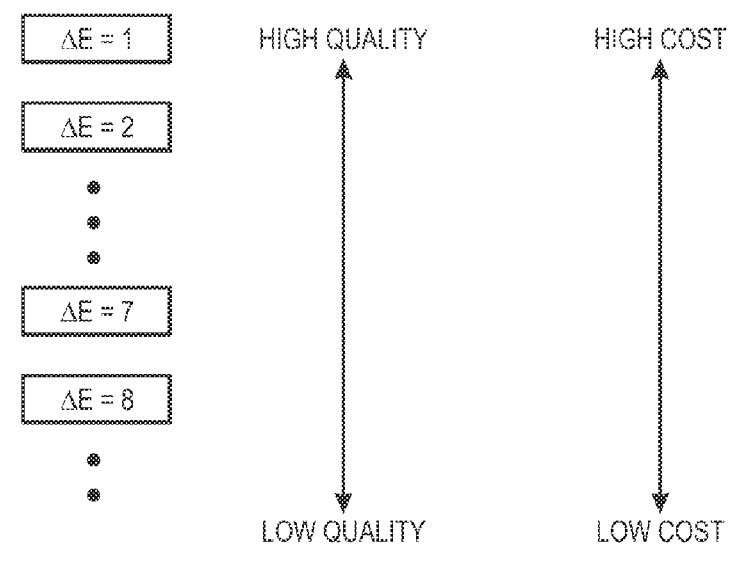
FIG. 2 depicts a spectrum of color accuracies for a plurality of print jobs that may be utilized in accordance with present embodiments.

For example, FIG. 2 depicts a spectrum of color accuracies for a plurality of print jobs 16 that may be utilized in accordance with present embodiments. As illustrated in FIG. 2, as $\Delta E$ increases, the quality of the print job 16 generally decreases. However, decreasing $\Delta E$ can lead to increased costs. More specifically, attaining high color accuracy and consistency has costs associated with running regular calibration jobs, which interrupt workflows and can cause print waste (e.g., of consumables, and so forth). In addition, attaining higher color accuracy can often result in shorter consumable lifetimes because attaining higher color accuracy generally precludes the use of older consumables. Obtaining high color accuracy may also be accomplished by using a higher end printing press 12 or a printing press 12 with an inline spectrophotometer for color monitoring of every page. Conversely, allowing lower color accuracy may result in higher utilization of the printing presses 12, but also generally results in greater rejection and rework rates for print jobs 16 of customers having higher color accuracy requirements. In other words, color accuracy generally depends on both the color accuracy requirement of the print job 16 and the difficulties or capabilities of the printing press 12 in accurately printing the particular print job content.

The embodiments presented herein include systems and methods for defining the color tolerance per print job 16 or per individual segments of the print job 16. As such, it is clear from the job submission stage through the job printing stage and finally the QA stage what the accepted color tolerance is, along with the pricing or cost involved with the chosen color tolerance. Defining the color tolerance for each print job 16 before printing increases the yield of the print jobs 16 as the requirements are defined up front and the print workflow and processes may be modified accordingly per the color tolerance needs. Defining the color tolerance for each print job 16 before printing also allows for pricing differentiation based on final color accuracy requirements. As such, the efficiency of the PSP will improve significantly.

More specifically, including the color accuracy requirements as a parameter with the submission of the print job 16 (e.g., in a JDF (job definition format) file, or other similar formats) enables the automated management and matching of the time-varying color accuracy capabilities of the printing presses 12 with the varying color accuracy requirements of the print jobs 16 being processed through the PSP. This enables the PSP to sort and schedule the print jobs 16, increase the yield of the print jobs 16 with higher color accuracy requirements, while also increasing overall production efficiency.

Conversely, conventional techniques generally uniformly apply target color accuracy guidelines to all print jobs 16. As such, when attempting to set tighter color accuracy requirements, the conventional techniques result in lower utilization and increased waste associated with extra consumable replacements, calibration steps, and so forth. Conversely, when attempting to set looser color accuracy requirements, the conventional techniques result in higher reject rates, more rework, and decreased customer satisfaction. In addition, the conventional techniques often require manual annotations to the job ticket, or other manual or custom attention to print jobs 16 having higher color accuracy requirements. Moreover, the conventional techniques often require designers and color experts (e.g., from the customer side) to be at the PSP to inspect quality and color tolerance, or to send the rejected print jobs 16 back for reprinting. This results in much higher labor costs and overheads.

Figure 3:
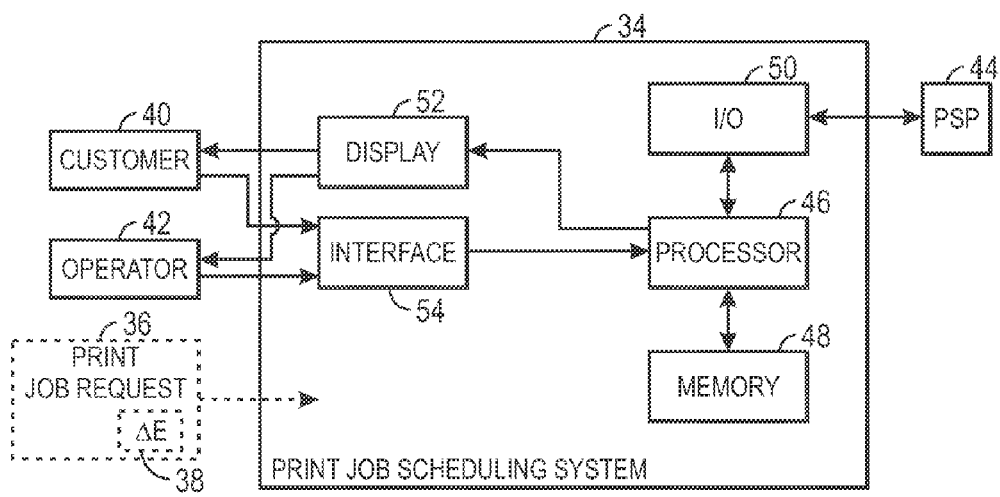
FIG. 3 is a block flow diagram of an example of a print job analysis system in accordance with present embodiments.

As described above, the embodiments presented herein address these shortcomings by enabling submission of color accuracy requirements with the submission of the print job 16. More specifically, in certain embodiments, an electronic device referred to as a print job analysis system 34 may be used to enter a print job request 36 relating to a particular print job 16, wherein the print job request 36 includes a color accuracy requirement level 38 for at least a portion of the requested print job 16. FIG. 3 is a block flow diagram of an example of the print job analysis system 34 in accordance with present embodiments. It should be understood that the print job analysis system 34 described herein may actually include multiple systems (e.g., a color requirement monitoring system, a job scheduling system, a production management system, and so forth) depending on the requirements of the separates systems. However, the print job analysis system 34 described herein is presented as addressing all of these various functions for the PSP 44.

In certain embodiments, the color accuracy requirement level 38 for the requested print job 16 may include at least two aspects. The first aspect is an absolute color accuracy requirement level for the print job 16, whereas the second aspect is a relative color accuracy requirement level within the print job 16. For example, for any given print job 16, the absolute color accuracy requirement level for a given instance of the print job 16 (e.g., a single brochure in a print job 16 for ten copies of the brochure) may be $\pm 8$ $\Delta E$, but the relative color accuracy requirement between instances of the print job 16 (e.g., between a first and second copy of the brochure) may be tighter ($\pm 1$ $\Delta E$), such that the instances all look the same, despite the absolute color accuracy of the instances.

As described in greater detail below, the print job analysis system 34 may be configured to receive the print job request 36 having the color accuracy requirement level 38 directly from a customer 40 (or from an operator 42 of the PSP 44). In addition, in certain embodiments, the print job analysis system 34 may also be configured to determine an appropriate color accuracy requirement level 38 for the print job request 36 if no color accuracy requirement level 38 is submitted with the print job request 36. Furthermore, in certain embodiments, the print job analysis system 34 may also be configured to provide an analysis of recommended color accuracy requirement levels 38 to the customer 40 and/or the operator 42 of the PSP 44 if they are unsure of an appropriate color accuracy requirement level 38 to be used for the particular print job 16. In addition, in certain embodiments, the printing presses 12 may include automatic quality control checks, which may include color quality checks, among other things. As such, the printing presses 12 may automatically set the sensitivity of the color quality checks based on an appropriate color accuracy requirement level 38.

As illustrated in FIG. 3, the print job analysis system 34 may include a processor 46, which may read from and write to a memory 48. The memory 48 may be a non-transitory, computer-readable medium (e.g., a hard drive, flash drive, random access memory (RAM), compact disc (CD), and so forth) having computer instructions encoded thereon, which are configured to perform many of the method steps described throughout the present disclosure. The processor 46 is configured to perform the computer instructions encoded on the memory 48. In addition, the memory 48 may store real-time and/or historical data relating to the machines (e.g., the color printers 20, the black/white printers 22, the collators 26, the cutters 28, the binders 30, and so forth) of the PSP 44 described above. Such data may be utilized in scheduling print job processes, such as the printing on the printing presses 12 (e.g., the color printers 20 described above).

In addition, in certain embodiments, data (e.g., the real-time and/or historical data described above) may be received from the PSP 44 via input/output (I/O) interfaces 50 that are connected to the machines (e.g., the color printers 20, the black/white printers 22, the collators 26, the cutters 28, the binders 30, and so forth) of the PSP 44. Furthermore, in certain embodiments, the print job analysis system 34 may include a display 52 for displaying information to the customer 40 and/or the operator 48 of the PSP 44 and one or more interfaces 54 (e.g., a keyboard, mouse, touchscreen, trackpad, scanning device, and so forth, or any combination thereof) for receiving inputs from the customer 40 and/or the operator 42. For example, as described above, the print job analysis system 34 may be configured to receive the print job request 36 having the color accuracy requirement level 38 directly via input from the customer 40 and/or the operator 42 received through the interfaces 54. In addition, as described above, the print job analysis system 34 may also be configured to provide an analysis of recommended color accuracy requirement levels 38 to the customer 40 and/or the operator 42 via the display 52 if they are unsure of an appropriate color accuracy requirement level 38 to be used for the particular print job 16.

Figure 4:
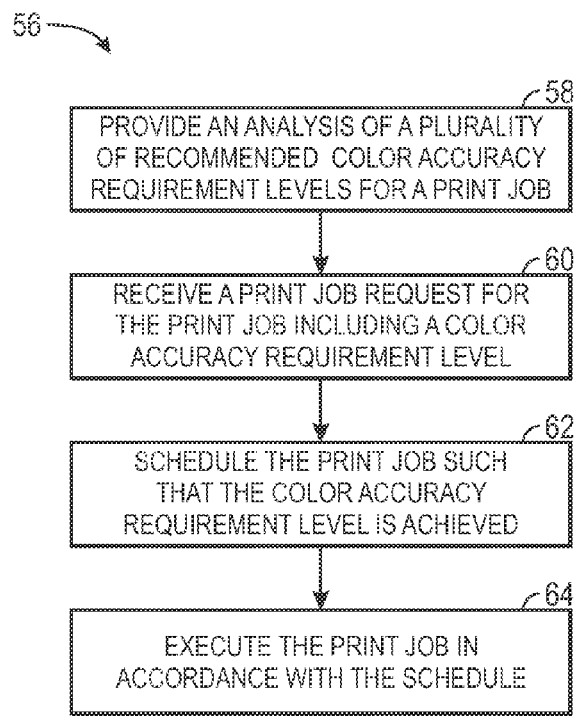
FIG. 4 is an example of a method for using a color accuracy requirement level as part of a print job request for a print job in accordance with present embodiments.

FIG. 4 is an example of a method 56 for using the color accuracy requirement level 38 as part of the print job request 36 for a particular print job 16 in accordance with present embodiments. In step 58, the print job analysis system 34 may optionally provide an analysis of a plurality of recommended color accuracy requirement levels 38 to the customer 40 and/or operator 42 of the PSP 44 for the print job 16. For example, if the customer 40 and/or operator 42 are unsure of an appropriate color accuracy requirement level 38 for the print job 16, the customer 40 and/or operator 42 may submit a request to the print job analysis system 34 (e.g., via the interfaces 54) to provide the plurality of recommended color accuracy requirement levels 38 (e.g., via the display 52) for the print job 16. In certain embodiments, the print job analysis system 34 may also provide pricing parameters (e.g., overall cost, cost per particular pages, cost versus time when the print job 16 will be delivered, and so forth) associated with the plurality of recommended color accuracy requirement levels 38 (e.g., via the display 52) for the print job 16. In general, the print job analysis system 34 evaluates the print job 16 to determine appropriate color accuracy requirement levels 38 to both maximize customer satisfaction in the resulting print job 16 and minimize the requirements (e.g., consumables, and so forth) for the printing presses 12, thereby improving the overall efficiency of the PSP 44.

Whether or not the customer 40 and/or operator 42 requests or uses the analysis described in step 58, in step 60, the print job analysis system 34 may receive the print job request 36 for the print job 16 via the interfaces 54. The print job request 36 includes the color accuracy requirement level 38, which is either entered directly by the customer 40 and/or operator 42 (on behalf of the customer 40) or selected from the plurality of recommended color accuracy requirement levels 38. In general, the color accuracy requirement level 38 will be submitted with the print job request 36 in a JDF (job definition format) file that defines the print job 16, or other similar digital format.

In certain embodiments, the customer 40 and/or operator 42 may specify different color accuracy requirement levels 38 for different segments of the print job 16. For example, the customer 40 and/or operator 42 may specify different color accuracy requirement levels 38 on a page-by-page basis. For example, on a mixed text and color plate book job, the customer 40 may specify a looser tolerance for the text pages, and a tighter tolerance for the color plates. Similarly, for a textbook with a mix of 1-color text, 2-color text and graphs, and 4-color text and image pages, the color accuracy requirement level 38 may vary significantly between pages.

In step 62, the requested print job 16 may be scheduled such that the color accuracy requirement level 38 submitted with the print job request 36 is achieved for the print job 16. More specifically, the print job analysis system 34 may analyze the print job 16 and the job plans for a plurality of printing presses 12 (e.g., the color printers 20 described above) to determine a print plan for the print job 16 that is feasible to achieve the color accuracy requirement level 38 associated with the print job 16. For example, each of the different printing presses 12 (e.g., inkjet, dry electrophotographic (EP), liquid electrophotographic (LEP), offset, and so forth) may have different color accuracy capabilities. Therefore, the job plan for the print job 16 may need to be scheduled for specific printing presses 12 that can meet the color accuracy requirement level 38 for the print job 16.

In addition, the print job analysis system 34 may analyze the print job 16 and the scheduling of calibration jobs for the plurality of printing presses 12 (e.g., the color printers 20 described above) to determine the print plan for the print job 16, which is feasible to achieve the color accuracy requirement level 38 associated with the print job 16. In general, printing press color consistency varies over time and is related to consumable lifetime and the time since the last calibration job. For example, Indigo printing presses tend to have higher color accuracy when consumables such as blankets are younger and when color calibration has been recently performed. Conversely, as the consumables age and the time since the last calibration increases, color accuracy generally diminishes.

The print job analysis system 34 takes this color consistency into account when scheduling the print job 16. For example, the print job analysis system 34 may schedule print jobs 16 with many colors and higher color accuracy requirement levels 38 on printing presses 12 shortly after consumable replacement and color calibration jobs on the printing presses 12. Conversely, the print job analysis system 34 may schedule print jobs 16 having mostly text and/or black and white images and lower color accuracy requirement levels 38 later, since their color accuracy requirement levels 38 may still be met. This process of scheduling the print jobs 16 at particular times with respect to servicing of the printing presses 12 that are selected to print the print jobs 16 increases the effective consumable lifetime, reduces waste, and increases throughput of the PSP 44 while also meeting customer color accuracy requirements. It should be understood that very large print jobs 16 may be switched out from printing presses 12 while servicing (e.g., the calibration jobs, replacement of consumables, and so forth) of the printing presses 12 is conducted.

In addition, the print job analysis system 34 determines the scheduling of the print job 16 based on scheduling of a plurality of other print jobs 16. In other words, while a particular printing press 12 at a particular time may provide the best fit with the color accuracy requirement level 38 of the print job 16, other print jobs 16 may also be closely matched to that particular printing press 12 at that particular time. As such, the timing and distribution (e.g., among printing presses 12) of the print jobs 16 may be adjusted accordingly to ensure that the color accuracy color requirements 38 for all of the print jobs 16 are achieved while also maximizing throughput of the PSP 44 and most effectively using the consumables of the printing presses 12.

Therefore, the print job analysis system 34 schedules the print jobs 16 in order to accomplish a variety of optimization constraints and goals. For example, the print job completion deadlines must be met by the print job analysis system 34, the individual print job costs and overall costs of the PSP 44 should be minimized, the print shop throughput should be maximized, the printing press and resource utilization rates should be maximized, and so forth. Knowing the color accuracy requirement levels 38 for the print jobs 16 provides a degree of flexibility and enables optimization of these various aspects by potentially reducing the time between consumable replacement and calibrations, while still maximizing production and meeting quality constraints.

Furthermore, in addition to knowing the print job intent (e.g., the color accuracy requirement level 38), the print job analysis system 34 takes into account the current and expected future states of the various devices (e.g., the printing presses 12 and other machines) so that the print job analysis system 34 may predict the possible or expected color tolerances the printing presses 12 will be able to meet for each print job 16 in the future. In this scenario, the print job analysis system 34 may also control the scheduling of some or all of the maintenance and calibration tasks. Moreover, the print job analysis system 34 may take into account the expected time and monetary costs of the various maintenance and calibration tasks, as well as the impact of the available color tolerance capabilities of the devices.

Returning now to the method 56 presented in FIG. 4, in step 64, the requested print job 16 may be printed in accordance with the scheduling determined in step 62. Generally speaking, unlike steps 58 through 62 of the method 56, the execution of the print job 16 on the printing press 12 that is selected by the print job analysis system 34 may include human operator intervention. Indeed, once a print plan (i.e., a particular printing press 12 or set of printing presses 12 at a particular time or series of times) is determined for the print job 16, the operator 42 of the PSP 44 may at least partially perform the print job 16 manually. For example, the operator 42 may set up the print job 16 on the printing press 12, monitor progress of the print job 16, remove the print job 16 once completed, perform QA for the print job 16 to ensure that the color accuracy requirement level 38 for the print job 16 was achieved, and so forth. However, in certain embodiments, as described above, the QA for the print job 16 may be performed automatically by the printing press 12 according to the color accuracy requirement level 38 for the print job 16.

Figure 5:
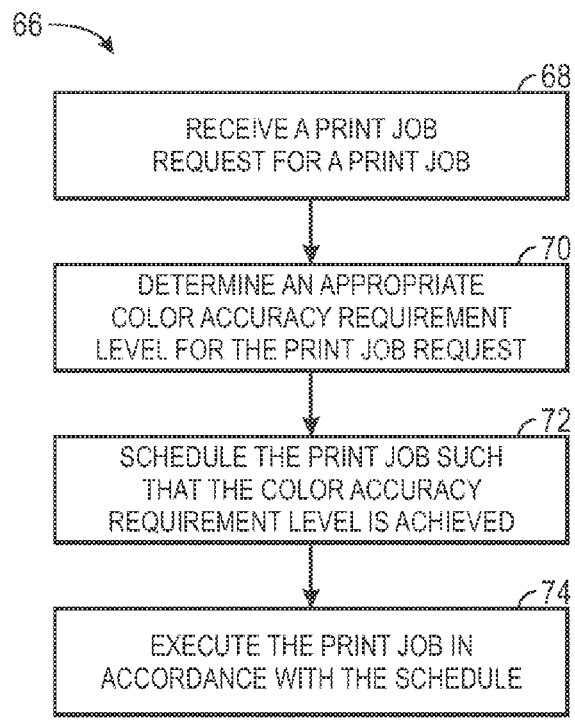
FIG. 5 is an example of another method for using the color accuracy requirement level in accordance with present embodiments.

FIG. 5 is an example of another method 66 for using the color accuracy requirement level 38 in accordance with present embodiments. More specifically, FIG. 5 describes the situation in which the color accuracy requirement level 38 is not submitted directly by the customer 40 and/or the operator 42 of the PSP 44 as part of the print job request 36 for a particular print job 16. Rather, the print job analysis system 34 may analyze the print job request 36 to determine an appropriate color accuracy requirement level 38 for the print job 16. In step 68, the print job analysis system 34 may receive the print job request 36 for the print job 16, which may be submitted via the interfaces 54. However, in contrast to step 60 described above, the print job request 36 does not include the color accuracy requirement level 38 being entered directly by the customer 40 and/or operator 42 or selected from the plurality of recommended color accuracy requirement levels 38. For example, the customer 40 and/or operator 42 may not know an appropriate color accuracy requirement level 38 to be used for the print job 16, or the color accuracy requirement level 38 may have simply been omitted as part of the print job request 36.

As such, in step 70, the print job analysis system 34 may determine the appropriate color accuracy requirement level 38 for the print job request 36 by analyzing the print job 16 based on a variety of parameters. In general, as described above, the print job analysis system 34 evaluates the print job 16 to determine an appropriate color accuracy requirement level 38 to both maximize customer satisfaction in the resulting print job 16 and minimize the requirements (e.g., consumables, and so forth) for the printing press 12 used to print the print job 16, thereby improving the overall efficiency of the PSP 44.

For example, the color accuracy requirement level 38 may be determined for the print job request 36 based on the type of customer 40 who is submitting the print job request 36. Certain customers 40 (e.g., magazines, book publishers, marketing firms, and so forth) may historically require higher color accuracy than other customers 40 (e.g., schools, churches, and so forth). As such, the print job analysis system 34 may take the type of customer 40 into account when determining a color accuracy requirement level 38 to automatically submit with the print job request 36. Moreover, the print job analysis system 34 may take the specific identity of the customer 40 into account when determining a color accuracy requirement level 38 to automatically submit with the print job request 36. In other words, the print job analysis system 34 may include historical data (e.g., a lookup table) relating to color accuracy requirement levels 38 the specific customer 40 has either directly requested or approved as appropriate color accuracy requirement levels 38 in previous print jobs 16.

The print job analysis system 34 may also take other parameters into account when determining a color accuracy requirement level 38 to automatically submit with the print job request 36. For example, the print job analysis system 34 may take print parameters (e.g., print size, substrate used, finish, amount of text versus images, types of images, number of images, amount of black & white versus color, and so forth)

of the print job 16 into account when determining the color accuracy requirement level 38. In addition, the print job analysis system 34 may take image parameters (e.g., image parameters based on an image content analysis) in the requested print job 16 into account when determining the color accuracy requirement level 38. Furthermore, the print job analysis system 34 may take pricing parameters (e.g., overall cost, cost per particular pages, cost versus time in which the print job 16 will be delivered, and so forth) of the print job request 36 into account when determining the color accuracy requirement level 38. For example, customers 40 submitting print job requests 36 at higher prices may generally expect higher color accuracy than customers 40 submitting print job request 36 at lower prices.

In addition, as described above, when determining an appropriate color accuracy requirement level 38 for the print job request 36, the print job analysis system 34 may actually determine that the color accuracy requirement level 38 should be set on a segment-by-segment (e.g., page-by-page) basis. For example, certain segments of the print job 16 may include primarily images, whereas other segments of the print job 16 may include primarily text. The print job analysis system 34 may take this into account and set different color accuracy requirement levels 38 for the different segments of the print job 16.

Once the print job analysis system 34 has automatically determined the appropriate color accuracy requirement level 38 (or color accuracy requirement levels 38) for the print job request 36, the print job analysis system 34 may, in certain embodiments, present the determined color accuracy requirement level 38 (or color accuracy requirement levels 38) to the operator 42 of the PSP 44 via the display 52, such that the operator 42 may approve of (or change) the determined color accuracy requirement level 38 (or color accuracy requirement levels 38) via the interfaces 54.

Then, in step 72, the requested print job 16 may be scheduled such that the color accuracy requirement level 38 submitted with the print job request 36 is achieved for the print job 16. Finally, in step 74, the requested print job 16 may be printed in accordance with the scheduling determined in step 72. It will be understood that steps 72 and 74 of the method 66 are substantially similar steps 62 and 64 of the method 56 described above with respect to FIG. 4.

The embodiments presented herein enable the PSP 44 to differentiate print jobs 16 by color accuracy requirement levels 38 that are either directly submitted with the print job requests 36 by the customers 40 (or with the help of the operators 42) or automatically determined by the print job analysis system 34. This enables the PSP 44 to increase production efficiency, increase customer satisfaction, and reduce waste (e.g., of consumables, and so forth). In addition, the embodiments presented herein enable a better fit between the print jobs 16 and the printing presses 12 available to perform the print jobs 16.

What is claimed is:

1. A method, comprising:
    receiving by an electronic device a print job request from a customer for printing of a requested print job;
    analyzing the print job request by the electronic device to determine a color accuracy requirement level for the requested print job;
    scheduling the requested print job by the electronic device for printing by a printing device at a particular time such that the color accuracy requirement level for the requested print job is achieved, including taking into account nominal color capabilities of the printing device, and including taking into account how the color capabilities vary temporally based on one or more factors; and
    causing the printing device to print the requested print job at the particular time, by the electronic device.

2. The method of claim 1, wherein scheduling the requested print job comprises scheduling the requested print job between a plurality of different printing presses having different color accuracy capabilities.

3. The method of claim 1, wherein scheduling the requested print job comprises scheduling the requested print job based on scheduling of calibration jobs for a plurality of printing presses upon which the requested print job may be printed.

4. The method of claim 1, wherein scheduling the requested print job comprises scheduling the requested print job based on scheduling of a plurality of other print jobs.

5. The method of claim 1, comprising determining the color accuracy requirement level for the requested print job based on the customer from which the print job request is received.

6. The method of claim 1, comprising determining the color accuracy requirement level for the requested print job based on a type of the customer from which the print job request is received.

7. The method of claim 1, comprising determining the color accuracy requirement level for the requested print job based on image parameters in the requested print job.

8. The method of claim 1, comprising determining the color accuracy requirement level for the requested print job based on a pricing parameter of the requested print job.

9. The method of claim 1, comprising determining the color accuracy requirement level for the requested print job on a page-by-page basis.

10. A method, comprising:
    receiving by an electronic device a print job request from a customer for printing of a requested print job, wherein the print job request includes a color accuracy requirement level for at least a portion of the requested print job;
    scheduling the requested print job by the electronic device for printing by a printing device at a particular time such that the color accuracy requirement level for the requested print job is achieved, including taking into account nominal color capabilities of the printing device, and including taking into account how the color capabilities vary temporally based on one or more factors; and
    causing the printing device to print the requested print job at the particular time, by the electronic device.

11. The method of claim 10, wherein scheduling the requested print job comprises scheduling the requested print job between a plurality of different printing presses having different color accuracy capabilities.

12. The method of claim 10, wherein scheduling the requested print job comprises scheduling the requested print job based on scheduling of calibration jobs for a plurality of printing presses upon which the requested print job may be printed.

13. The method of claim 10, wherein scheduling the requested print job comprises scheduling the requested print job based on scheduling of a plurality of other print jobs.

14. The method of claim 10, comprising providing a plurality of color accuracy requirement levels to the customer via the electronic device such that the customer can select the color accuracy requirement level for inclusion with the print job request.

15. The method of claim 14, comprising providing pricing parameters associated with the plurality of color accuracy requirement levels to the customer via the electronic device.

16. A non-transitory, computer-readable medium having computer instructions encoded thereon, wherein the computer instructions comprise instructions for:
  receiving a print job request from a customer for printing of a requested print job, wherein the print job request includes a color accuracy requirement level for at least a portion of the requested print job; and
  scheduling the requested print job for printing by a printing device at a particular time such that the color accuracy requirement level for the requested print job is achieved, including taking into account nominal color capabilities of the printing device, and including taking into account how the color capabilities vary temporally based on one or more factors; and
  causing the printing device to print the requested print job at the particular time.

17. The non-transitory, computer-readable medium of claim 16, wherein the computer instructions comprise instructions for providing a plurality of color accuracy requirement levels to the customer such that the customer can select the color accuracy requirement level for inclusion with the print job request.

18. The non-transitory, computer-readable medium of claim 16, wherein the computer instructions comprise instructions for providing pricing parameters associated with the plurality of color accuracy requirement levels to the customer.

* * * * *